(12) United States Patent
Vassal et al.

(10) Patent No.: US 7,608,207 B2
(45) Date of Patent: Oct. 27, 2009

(54) METHOD FOR PREPARING A PHOTOCHROMIC POLYURETHANE LATEX AND APPLICATION TO OPHTHALMIC OPTICS

(75) Inventors: Nathaly Vassal, Paris (FR); Jean-Pierre Vairon, Bourg la Reine (FR); Bernadette Charleux, Vincennes (FR); Pascale Tardieu, Paris (FR); Sylvette Maisonnier, Moisselles (FR); Jean-Paul Cano, Chennevieres sur Marne (FR)

(73) Assignee: Essilor International Compagnie Generale d'Optique, Charenton-le-Pont (FR)

( * ) Notice: Subject to any disclaimer, the term of this patent is extended or adjusted under 35 U.S.C. 154(b) by 186 days.

(21) Appl. No.: 10/332,287

(22) PCT Filed: Jul. 6, 2001

(86) PCT No.: PCT/EP01/07771

§ 371 (c)(1),
(2), (4) Date: Jul. 25, 2003

(87) PCT Pub. No.: WO02/04535

PCT Pub. Date: Jan. 17, 2002

(65) Prior Publication Data

US 2004/0012002 A1    Jan. 22, 2004

(30) Foreign Application Priority Data

Jul. 7, 2000    (FR) .................................. 00 08937

(51) Int. Cl.
*G02B 5/23* (2006.01)
*G03C 1/72* (2006.01)

(52) U.S. Cl. .................. 252/586; 252/182.2; 359/4; 430/339

(58) Field of Classification Search ................. 252/586, 252/182.2; 359/4; 430/339
See application file for complete search history.

(56) References Cited

U.S. PATENT DOCUMENTS

| | | | |
|---|---|---|---|
| 4,889,413 A | 12/1989 | Ormsby et al. | 350/354 |
| 5,354,808 A * | 10/1994 | Onwumere et al. | 524/837 |
| 5,541,251 A * | 7/1996 | Bontinck et al. | 524/507 |
| 5,603,757 A * | 2/1997 | Mizuguchi et al. | 106/404 |
| 5,688,356 A | 11/1997 | Sagiv | 156/331.7 |
| 6,031,041 A * | 2/2000 | Chung et al. | 524/507 |
| 6,077,648 A * | 6/2000 | Nair et al. | 430/350 |
| 6,083,427 A | 7/2000 | Henry | 252/586 |

FOREIGN PATENT DOCUMENTS

| | | |
|---|---|---|
| JP | 09296106 | 11/1997 |
| JP | 10-025471 | * 1/1998 |
| WO | WO 98/37115 | 8/1998 |

* cited by examiner

*Primary Examiner*—Timothy J Kugel
(74) *Attorney, Agent, or Firm*—Fulbright & Jaworski L.L.P.

(57) ABSTRACT

The method of the invention comprises: a) forming a hydrophilic polyurethane prepolymer with isocyanate end groups, by the polyaddition reaction of at least one polyol and at least one diisocyanate in the presence of at least one internal emulsifying agent; b) mixing the polyurethane prepolymer with a photochromic agent; c) adding water or a mixture of water and solvent, under agitation, to the mixture of the polyurethane prepolymer and the photochromic agent, to form an emulsion; and d) adding at least one chain extension agent to the emulsion and performing a chain extension reaction to give the final photochromic polyurethane latex. Application to the production of ophthalmic articles having photochromic properties.

28 Claims, 4 Drawing Sheets

METHOD FOR PREPARING A PHOTOCHROMIC POLYURETHANE LATEX AND APPLICATION TO OPHTHALMIC OPTICS

This application is a U.S. national phase application under 35 U.S.C. § 371 of PCT Application No. PCT/EP01/07771 filed 6 Jul. 2001, which claims priority to French Application No. 00/08937 filed 7 Jul. 2000.

The present invention relates in general to a method for preparing a photochromic polyurethane latex, and to ophthalmic articles, such as spectacle lenses, comprising an organic or optionally inorganic glass substrate coated with a film of photochromic material obtained by depositing and drying a photochromic polyurethane latex.

As is well known, latexes are stable dispersions of one or more polymers in an essentially aqueous medium, in other words composed of water only or a mixture of water and an organic solvent present in a quantity less than 50% by weight of the mixture, preferably of the order of 30% by weight or less of the mixture.

Polyurethane aqueous dispersions or latexes (PU latexes) are well known.

The preparation of such PU dispersions or latexes is widely described in the literature.

A method currently used to prepare these PU latexes consists of forming a polyurethane prepolymer by bulk polymerization, by polyaddition reaction between an excess of a diisocyanate and a polyol, then adding water under agitation to the PU prepolymers thus formed to obtain a prepolymer dispersion, followed by adding a chain extension agent to the dispersion obtained in order to perform a chain extension reaction to obtain the desired polyurethane latex.

This method, which is currently the most used, avoids the use of large quantities of solvent and introduces some crosslinking sites within the polyurethane obtained.

The synthesis of the PU prepolymer is preferably performed in the presence of an internal emulsifying agent which has the function of introducing hydrophilic groups into the PU prepolymer, and consequently into the final PU polymer, which thus stabilizes the final dispersions.

The PU prepolymers obtained contain terminal isocyanate groups and are generally hydrophilic.

The preferred internal emulsifying agents contain ionic groups, generally anionic.

The preferred PU prepolymers obtained during the preparation method are ionomers, in particular anionomers.

The preparation method preferably contains a step of neutralization of the PU prepolymer before the water dispersion step.

This classical method of preparing a PU latex may be schematized as follows:

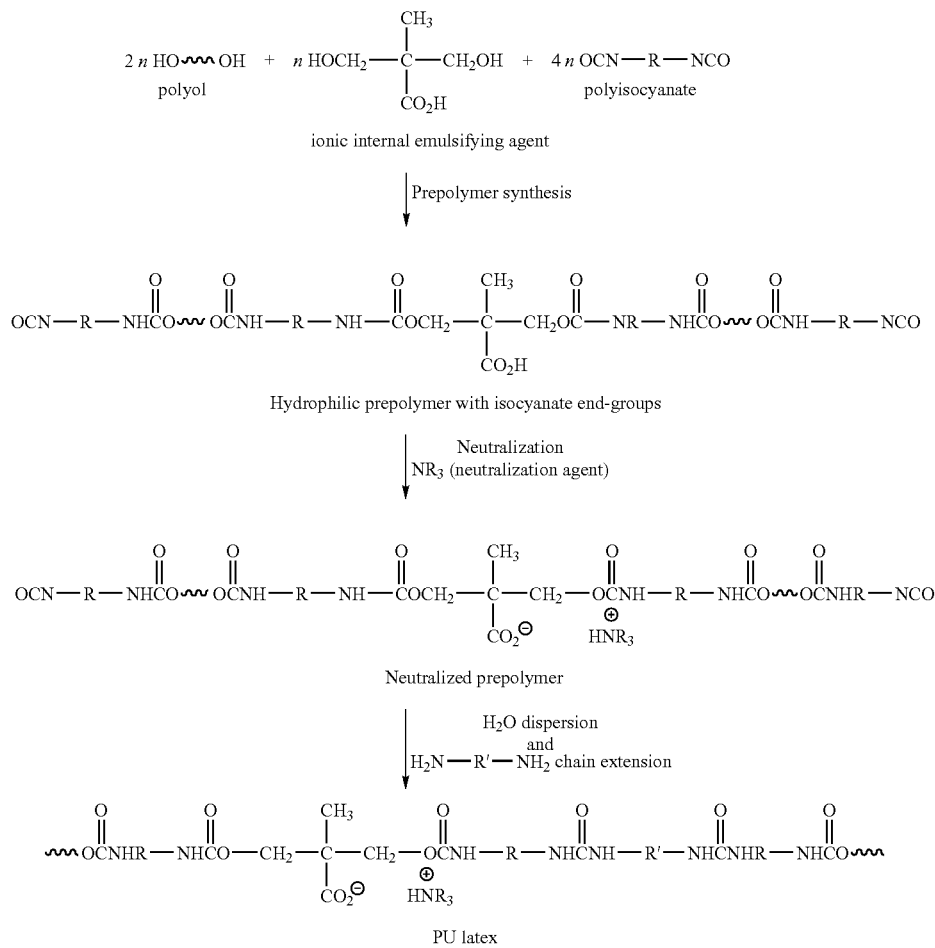

The success of the dispersion depends on the viscosity of the prepolymer, which must be limited. It is also normal to add a small quantity of organic solvent to the prepolymers to reduce their viscosity, without it being necessary to remove this solvent during the subsequent steps of the method.

The isocyanate functions (NCO) of the prepolymer tend to react with water, and the dispersion step is thus preferably carried out at a relatively low temperature to minimize the reaction between the water and the NCO functions.

Lastly, the chain extension to obtain the final PU dispersion (latex) is generally performed by the addition of a polyamine, in particular a diamine, to the dispersion.

The incorporation of photochromic compounds into PU varnishes to obtain photochromic varnishes, in particular for ophthalmic optics, has already been proposed.

Thus, the document WO 98/37115 discloses a method for manufacturing a composition based on photochromic polyurethanes, in which the photochromic compound is incorporated into the coating composition by dissolving or dispersing the photochromic compound into the polyol component or the isocyanate component or by addition to a mixture of the precursor monomers of the polyurethane.

As an alternative, this document states that the photochromic compound may be incorporated into the hardened coating by soaking, permeation, or any other known transfer method.

Similarly, U.S. Pat. No. 4,889,413 discloses a method for producing a polyurethane-based plastic material with photochromic properties, in which the photochromic compound is incorporated either into the diisocyanate component, or into the polyol component, or into a mixture of the two or any other component of the reaction mixture, then the mixture is polymerized to form the polyurethane.

The availability of photochromic latexes would be desirable.

However, the production of photochromic latexes of optical quality involves several difficulties.

On the one hand, it is necessary to obtain a completely homogeneous distribution of the photochromic compounds in the latex itself and even more so in the dried varnishes containing them, since these must not have any light diffusion characteristics.

On the other hand, the properties of the photochromic compounds must not be affected, or at the least not affected to a degree which would render the photochromic properties unusable, either because of a reduction in the photochromic properties (kinetics, colorability), or of a loss of the photochromic compound by degradation during the latex preparation in particular.

This problem is all the more crucial for photochromic compounds of the spirooxazine type, sensitive to their environment, in particular to the acidity of the medium in which they are dispersed.

Lastly, the latexes obtained must be stable over time, in particular regarding their photochromic properties.

Figure 1:
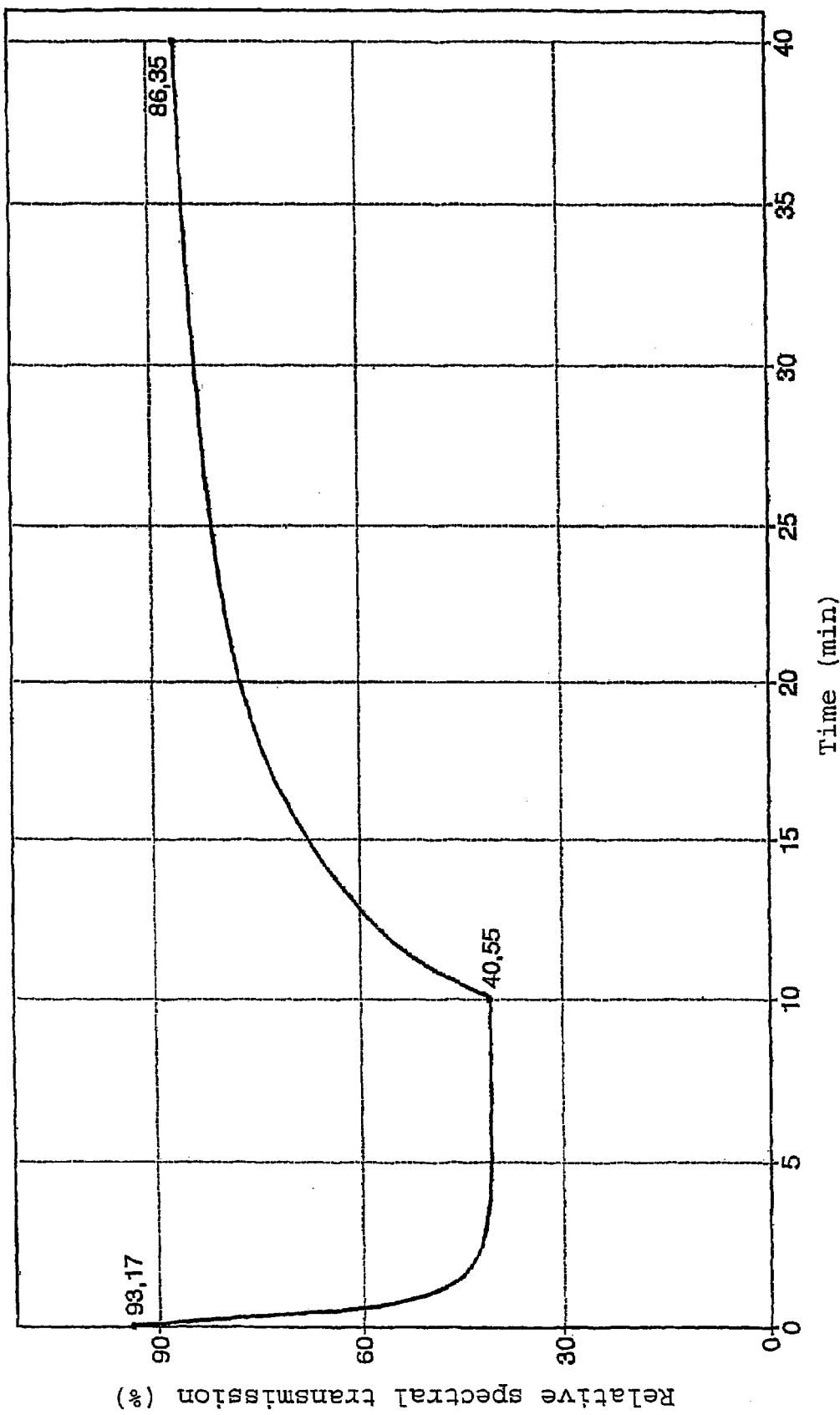
FIG. 1—Spectrokinetic properties of the latex of Example 8.

The object of the present invention is thus a method for preparing a photochromic polyurethane latex, which resolves the technical problems listed above and which in particular avoids any risk of deterioration of the photochromic properties of the photochromic component during the preparation of the latex, while ensuring a homogeneous distribution of this photochromic component within the latex and consequently within the hardened photochromic film obtained from the latex.

The above objects are achieved, according to the invention, by a method for preparing a photochromic polyurethane latex which comprises:

a) forming a hydrophilic polyurethane prepolymer (PU prepolymer) with isocyanate end groups, by the polyaddition reaction of at least one polyol and at least one polyisocyanate in the presence of at least one internal emulsifying agent;

b) mixing the polyurethane prepolymer obtained in step a) with a photochromic agent;

c) adding water or a mixture of water and solvent, under agitation, to the mixture of the polyurethane prepolymer and the photochromic agent, to form an emulsion; and d) adding at least one chain extension agent to the emulsion and performing a chain extension reaction to give the final photochromic polyurethane latex.

The organic polyols, in other words diols, triols, etc., used for the preparation of the latex of the present invention are polyols which react with an isocyanate component to produce a polyurethane.

Examples of polyols which may be used in the present invention include (1) the polyols of low molecular weight, in other words polyols with an average molecular weight less than 400, for example aliphatic diols, such as the $C_2$-$C_{10}$ aliphatic diols, triols, and higher polyols; (2) the polyester polyols, (3) the polyether polyols; (4) the polyols containing amide groups, (5) the polyacrylic polyols, (6) the epoxypolyols, (7) the polyvinyl polyols, (8) the urethane polyols, and (9) mixtures of such polyols.

The organic polyols are preferably selected from polyols of low molecular weight, polyacrylic polyols, polyether polyols, polyester polyols and their mixtures, and, even more preferably, from the polyacrylic polyols, polyether polyols, polyester polyols and their mixtures.

The particularly preferred organic polyols are the polyacrylic polyols, the polyether polyols and their mixtures.

Among the polyols of low molecular weight suitable for the method of the present invention may be cited pentaerythritol, trimethylolethane, trimethylolpropane, di(triiethylolpropane)dimethylolpropionic acid, ethylene glycol, propylene glycol, 1,2-butenediol, 1,4-butenediol, 1,3-butenediol, 2,2,4-trimethyl-1,3-pentanediol, 1,5-pentanediol, 2,4-pentanediol, 1,6-hexanediol, 2,5-hexanediol, 2-methyl-1,3-pentanediol, 2,4-heptanediol, 2-ethyl-1,3-hexanediol, 2,2-dimethyl-1,3-propanediol, 1,4-cyclohexanediol, 2,2-dimethyl-3-hydroxypropyl-2,2-dimethyl-3-hydroxypropionate, diethylene glycol, triethylene glycol, tetraethylene glycol, dipropylene glycol, tripropylene glycol, 1,4-cyclohexanedimethanol, 1,2-bis(hydroxymethyl)cyclohexane, 1,2-bis(hydroxyethyl)cyclohexane, the bis-hydroxypropylidantoins, trishydroxyethylisocyanurate, the product of alkoxylation of 1 mole of 2,2-bis(4-hydroxyphenyl)propane (bisphenol A) and 2 moles of propylene oxide, and analogs, for example ethoxyled or propoxylated trimethylol or pentaerythritol, with an average molecular weight less than 400.

The polyester polyols are also known compounds, with an average number molecular weight of between 500 and 10 000. Among the preferred polyester polyols may be cited the polylactone diols such as the polycaprolactone diols, the polypropiolactone diols and the polybutyrolactone diols.

The polyether polyols are known compounds, which generally have an average number molecular weight of between 400 and 10 000.

Examples of these polyether polyols include various polyoxyalkylene polyols, polyalkoxylated polyols with an average number. molecular weight of more than 400, such as for example the poly(oxytetramethylene)diols and their mixtures.

The polyols containing amide groups, the epoxypolyols, the vinyl polyols, the urethane polyols and the polyacrylic polyols are also compounds known in the art.

These organic polyols and their methods of preparation are described in document WO 98/37115.

The preferred polyols for the method of the present invention are the polycaprolactone diols, which provide good stability to hydrolysis and good low-temperature properties to the PU formed.

The polyisocyanate component of the present invention includes polyisocyanate compounds with isocyanate groups which are "free", "blocked" or "partially blocked", "modified", "unmodified" and mixtures of "modified" and "unmodified" compounds.

The term "modified" means that the polyisocyanates have been changed in a known way to introduce biurea, urea, carbodiimide, urethane or isocyanurate groups.

The polyisocyanates may be selected from the aliphatic, aromatic, cycloaliphatic, heterocyclic polyisocyanates and their mixtures.

The polyisocyanates of the invention are preferably diisocyanates.

Among the available diisocyanates may be cited toluene-2,4-diisocyanate, toluene-2,6-diisocyanate, diphenylmethane-4,4'-diisocyanate, diphenylmethane-2,4'-diisocyanate, paraphenylene diisocyanate, biphenyldiisocyanate, 3,3'-dimethyl-4,4'-diphenylene diisocyanate, tetramethylene-1,4-diisocyanate, hexamethylene-1,6-diisocyanate, 2,2,4-trimethyl hexane-1,6-diisocyanate, lysine methyl ester diisocyanate, bis(isocyanatoethyl)fumarate, isophorone diisocyanate, ethylene diisocyanate, dodecane-1,12-diisocyanate, cyclobutane-1,3-diisocyanate, cyclohexane-1,3-diisocyanate, cyclohexane-1,4-diisocyanate, methylcyclohexyl diisocyanate, hexahydrotoluene-2,4-diisocyanate, hexahydrotoluene-2,6-diisocyanate, hexahydrophenylene-1,3-diisocyanate, hexahydrophenylene-1,4-diisocyanate, perhydrodiphenylmethane-2,4'-diisocyanate, perhydrophenylmethane-4,4'-diisocyanate, and their mixtures.

The polyisocyanate compound is preferably selected from the group consisting of hexamethylene-1,6-diisocyanate, isophorone diisocyanate, ethylene diisocyanate, dodecane-1,12-diisocyanate, cyclohexane-1,3-diisocyanate, and their mixtures, and, even more preferably, from hexamethylene-1,6-diisocyanate, isophorone diisocyanate, ethylene diisocyanate, and their mixtures, because of the low reactivity of their NCO functions with water.

The polyisocyanates suitable for the method of the present invention are also described in detail in the document WO 98/37115.

The internal emulsifying agents are also compounds well known in the art.

The addition of these internal emulsifying agents during the synthesis of the polyurethanes has the function of introducing hydrophilic groups into the polymer chain.

The introduction of these hydrophilic groups into the polyurethane chain has many advantages for the preparation of polyurethane dispersions (latexes).

Thus, the introduction of such hydrophilic groups allows the use of dispersion methods which do not require high shearing forces, leading to finer particles, better dispersion stability, and reduced sensitivity to water of the polymers obtained after evaporation of the water.

Although non-ionic internal emulsifying agents may be used, the preferred internal emulsifying agents are in general ionic compounds, preferably anionic, allowing the introduction into the polyurethane chain of ionic hydrophilic groups, preferably anionic groups. The preferred anionic emulsifying agents are the diamine and diol sulfonates and the dihydroxycarboxylic acids.

Among the dihydroxycarboxylic acids, the preferred acid is α,α-dimethylolpropionic acid (DMPA).

As examples of internal emulsifying agents, the following may be cited:

Anionic agents

Sulfonate type

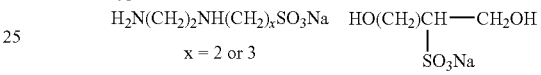

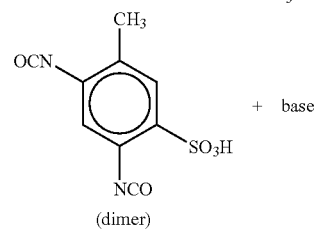

Carboxylate type

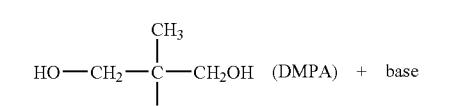

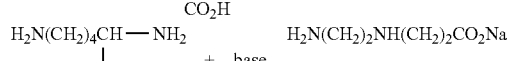

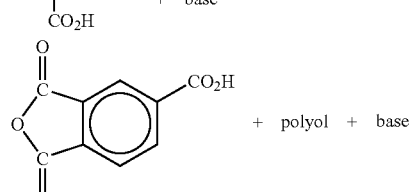

Cationic agents

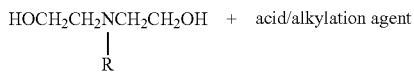

These internal emulsifying agents are described among others in the patents FR-A-76 23 992, U.S. Pat. Nos. 4,116, 902 and 4,098,743.

In general, the quantity of internal emulsifying agent used in the reaction mixture of step (a) is such that the concentration in ionic hydrophilic groups of the polyurethane is about 1% by weight or less.

The quantity of internal emulsifying agent used in the reaction mixture of step (a) preferably represents from 3 to 5% by weight with respect to the total weight of the polyisocyanate, polyol, and internal emulsifying agent components.

In general, in the step (a) of the method of the invention, an excess of the polyisocyanate component with respect to the polyol component is used.

The relative quantities of the polyol component and the polyisocyanate component used in step (a) for the formation of the prepolymer are preferably such that the ratio of the OH groups of the polyols with respect to the NCO groups of the polyisocyanates is about 1:2.

When an internal emulsifying agent containing ionic groups is used, the method of the invention preferably comprises, in addition, a step of neutralization of these groups present in the PU prepolymer.

In the case of anionic groups such as the carboxylic acid groups, this neutralization is performed by addition of a base, for example a tertiary amine such as triethylamine.

Thus, the PU prepolymer obtained in step (a) is preferably a neutralized ionomer PU prepolymer (generally-anionomer).

The step of the formation of the hydrophilic PU prepolymer with isocyanate end groups is generally performed at a relatively high temperature, of about 90° C.

The following step of the method of the invention consists of incorporating a photochromic agent into the hydrophilic PU prepolymer with isocyanate end groups.

This incorporation of the photochromic agent may be performed by direct mixing, under agitation, of the photochemical agent or a solution of the photochromic agent in a solvent in the mixture containing the PU prepolymer, at a relatively low temperature, generally of about 60° C.

Moreover, this incorporation of the photochromic agent into the PU prepolymer gives a homogeneous dispersion of the photochromic agent in the prepolymer and consequently in the polymer and the final coating.

Any conventional photochromic agent may be used in the method of the invention.

As is well known, these photochromic agents are organic photochromic compounds which, when excited by light radiation, show at least one maximum absorption wavelength in the range 400 to 700 nm. They may be used either individually, or in combination with other photochromic compounds.

In addition, these photochromic compounds may be incorporated either in the dissolved state in a suitable solvent, or in the dispersed state in the PU prepolymer.

Among the preferred photochromic compounds may be cited chromene and photochromic compounds of chromene such as pyran compounds, in particular the spiropyrans, oxazine compounds, in particular the spirooxazines, the fulgides and fulgimides, and the organometallic derivatives of dithizonate. Chromene and the photochromic chromene components are well known and are disclosed among others in the documents EP-0 246114, EP-0 401 959, EP-0 629 656, EP-0 676 401, FR-A-2 688 782, FR-A-2 718 447, WO 90/07507, WO 91/06861, U.S. Pat. Nos. 3,567,605, 5,066, 818, 5,395,567, 5,451,344, 5,645,767 and 5,658,501.

Chromene is represented by the following structure:

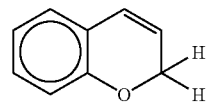

The preferred photochromic compounds of chromene may be represented by the formula:

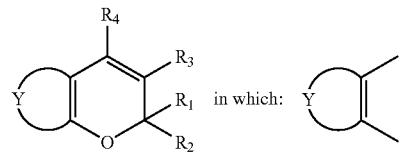

represents an optionally substituted aromatic hydrocarbon radical or an optionally substituted unsaturated heterocyclic radical:

$R_1$ and $R_2$ represent identical or different radicals selected from a hydrogen atom, a hydrocarbon radical and a substituted amino radical, or forming a ring in combination; and $R_3$ and $R_4$ represent identical or different radicals selected from a hydrogen atom, a hydrocarbon radical and a substituted amino radical.

The photochromic oxazine compounds are also well known compounds.

They are described, among others, in the documents U.S. Pat. Nos. 4,562,172, 3,578,602, 4,215,010, 4,720,547, 5,139, 707, 5,114,621, 5,529,725, 5,645,767, 5,658,501, WO 87/00524, FR-A-2 647 789, FR-A-2 647 790, EP-A-0 245 090 and EP-A-0 783 483.

The preferred oxazine compounds are compounds of the type spiro[indolino]naphtho and benzoxazine, and spiro indolinopyridobenzoxazine.

Among the preferred oxazine compounds may be cited the compounds with a structure of formula:

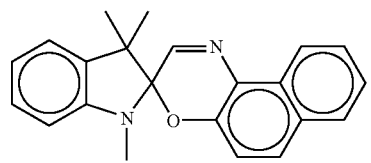

The method of the invention is particularly suitable for the use of photochromic oxazine compounds as photochromic agents in the PU latexes, these compounds being particularly sensitive to heat and difficult, or even impossible, to incorporate in a hardened polymer film such as a film obtained by drying a PU latex.

The photochromic fulgides and fulgimides are known compounds and are described among others in the patents U.S. Pat. No. 4,931,220 and EP-A-0 629 656.

Similarly, the organometallic compounds of dithizonate are known and described in the U.S. Pat. No. 3,361,706.

The preferred photochromic compounds are the derivatives of chromene and the derivatives of oxazine such as the benzoxazines and the naphthoxazines, in particular the spiro [indolino]benzoxazines and naphthoxazines.

The photochromic agents incorporated in the PU prepolymers of the method of the present invention may comprise a single photochromic compound or a mixture of photochromic compounds.

The quantity of photochromic agent introduced into the PU prepolymer generally represents from 0.1 to 30%, preferably 0.1 to 15% and more preferably from 2 to 10% by weight with respect to the total weight of polyol, polyisocyanate, internal emulsifying agent and photochromic agent used for the preparation of the latex.

As stated above, these photochromic agents may be introduced by dispersion into the PU prepolymer or in the form of a solution in a solvent or mixture of solvents.

Any solvent suitable for the photochromic agents and compatible with the polyurethane prepolymer may be used as solvent.

Among the solvents which may be used are dimethylformamide (DMF) and N-methylpyrrolidone (NMP).

A particularly suitable solvent is N-methylpyrrolidone.

The following step of the method of the invention consists of forming an essentially aqueous dispersion or emulsion of the PU prepolymer by addition of water or a mixture of water and solvent to the PU prepolymer containing the photochromic agent.

This addition of water or a water/solvent mixture is typically performed with vigorous agitation to obtain a uniform emulsion. In general, this emulsification step is performed at a relatively low temperature, or the order of 60° C.

Among solvents suitable for the formation of the emulsion are DMF and NMP.

When a solvent is used to form the emulsion, the quantity of solvent in the water/solvent mixture is less than 50% by weight, preferably less than 30% by weight and more preferably of about 20% by weight.

The solvent reduces the viscosity of the prepolymer and thus facilitates the dispersion step.

After, or optionally during, the formation of the dispersion, according to the method of the invention, a chain extension agent is added, and a chain extension reaction is performed to obtain the dispersion or the final latex of the PU polymer according to the invention.

These chain extension agents are well known and are preferably polyamines such as diamines.

Among the preferred chain extension agents may be cited the alkylenediamines such as ethylenediamine, diethylenetriamine and tris(2-aminoethyl)amine.

The quantity of chain extension agent added obviously depends on the desired degree of polymerization for the PU polymer in the final dispersion.

Generally, this quantity varies in a molar ratio n prepolymer/n extension agent between 0.2 and 2.

This chain extension step, which may be performed simultaneously with the step of dispersion of the PU prepolymer in the aqueous medium, or subsequently, is generally performed at a relatively low temperature of about 60° C.

During the method of preparation of the PU latex according to the invention, various additives may also be incorporated, either before, or simultaneously, or after the incorporation of the photochromic agent. For example, UV absorbers may be mixed with the photochromic compounds before their addition to the PU prepolymers. Similarly, stabilizers may be mixed with the photochromic agents before their addition to the PU prepolymers. Such stabilizers are known in the art and are described in the U.S. Pat. Nos. 4,720,356 and 5,391,327.

Other conventional ingredients may be added during the method of manufacture of the PU latex according to the invention.

These additional ingredients comprise, for example, agents for adjusting the rheology, levelling agents, for example surface-active agents, initiators, agents for inhibiting hardening, agents for removing free radicals and agents improving adhesion.

These additives and ingredients may be introduced during the different steps of preparation of the PU latex, or directly into the photochromic coatings obtained after deposit and drying of the polyurethane latex.

The PU latexes obtained by the method of the invention generally have a concentration in solids of at least 30% by weight (as measured by determination of the dry extract after drying at 80° C. for 12 hours). The dimension of the latex particles generally varies from 50 to 300 nm, preferably 150 to 250 nm. The pH of the latexes obtained is generally greater than 7 and normally between 8 and 9. The viscosity is generally between 10 and 20 mPa·s, as measured at 24° C. by a Brookfield viscosimeter.

The latexes of the present invention preferably have a total solvent concentration, for example of N-methylpyrrolidone, equal to or less than 20% by weight with respect to the total weight of the latex.

The polyurethane latexes according to the invention are particularly suitable for producing photochromic coatings on various substrates and in particular on organic glass substrates.

In particular, the photochromic PU latexes according to the invention are especially suitable for producing photochromic coatings on thermoplastic or thermosetting transparent organic polymer materials.

The photochromic latexes according to the invention may be applied to any type of substrate by conventional techniques known to a person skilled in the art, notably:

by immersion in the bath of photochromic latex (dip-coating)

or by application onto the surface of the substrate followed by centrifugation to ensure uniform application of the latex on the surface.

The latex film is then dried under conventional conditions, for example at a drying temperature of between ambient temperature and 100° C. and with a drying time generally between 30 seconds and 1 hour and preferably between 5 minutes and 1 hour.

The film thicknesses obtained are fixed as a function of the level of the photochromic effect desired.

Generally, and taking account of the quantity of photochromic compound present in the latex, the thickness varies from 3 to 20 μm and preferably 5 to 15 μm.

The preferred substrates onto which the latexes obtained by the method of the invention are applied are any organic or inorganic glass substrate currently used for organic ophthalmic lenses.

Polycarbonate (thermoplastic) substrates, in particular ophthalmic lenses manufactured by the Gentex Optics Company, are particularly suitable substrates onto which the latexes obtained by the method of the invention are applied.

Among other suitable substrates may be cited substrates obtained by polymerization of alkyl methacrylates, in particular $C_1$-$C_4$ alkyl methacrylates such as methyl(meth)acrylate and ethyl(meth)acrylate, allyl derivatives such as the allyl carbonates of aliphatic or aromatic polyols, linear or branched, thio(meth)acrylates, thiourethanes, polyethoxylated aromatic (meth)acrylates such as the polyethoxylated bisphenolate dimethacrylates.

Among suitable substrates may be cited substrates obtained by polymerization of allyl carbonates of polyols including ethylene glycol bis(allyl carbonate), diethylene glycol bis(2-methyl carbonate), diethylene glycol bis(allyl carbonate), ethylene glycol bis(2-chloro allyl carbonate), triethylene glycol bis(allyl carbonate), 1,3-propanediol bis(allyl carbonate), propylene glycol bis(2-ethyl allyl carbonate), 1,3-butenediol bis(allyl carbonate), 1,4-butenediol bis(2-bromo allyl carbonate), dipropylene glycol bis(allyl carbonate), trimethylene glycol bis(2-ethyl allyl carbonate), pentamethylene glycol bis(allyl carbonate), isopropylene bisphenol-A bis(allyl carbonate).

The particularly recommended substrates are the substrates obtained by polymerization of the bis(allyl carbonate) of diethylene glycol, marketed under the trade name CR 39® by PPG INDUSTRIES (lens ORMA® ESSILOR).

Among substrates which are also suitable are substrates obtained by polymerization of thio(meth)acrylic monomers, such as those described in the French patent application FR-A-2 734 827.

The substrates may obviously also be obtained by polymerization of mixtures of the monomers listed above.

It is possible to apply other coatings onto the photochromic film such as anti-abrasion coatings and anti-reflection coatings.

The hard anti-abrasion coatings may be any anti-abrasion coatings known in the ophthalmic optics field.

Among the hard anti-abrasion coatings suitable in the present invention are coatings obtained from compositions based on silane hydrolysate, in particular the hydrolysate of epoxy silane, as described in the French patent application N° 93 026 49 and the U.S. Pat. No. 4,211,823.

As stated above, the ophthalmic lens according to the invention may additionally contain an anti-reflection coating deposited on the anti-abrasion coating.

As an example, the anti-reflection coating may be composed of a mono- or multilayer film, of dielectric materials such as $SiO_2$, $SiO_2$, $Si_3N_4$, $TiO_2$, $ZrO_2$, $Al_2O_3$, $MgF_2$ or $Ta_2O_5$ or their mixtures.

It is thus possible to prevent the appearance of a reflection at the lens-air interface.

This anti-reflection coating is generally applied by vacuum deposit according to one of the following techniques:
  by evaporation, optionally assisted by ion beam;
  by ion-beam spraying;
  by cathodic spraying;
  by chemical deposit in the vapour phase assisted by plasma.

In addition to vacuum deposit, it is also possible to deposit an inorganic layer by the sol/gel route (for example from tetraethoxysilane hydrolysate).

In the case where the film consists of a single layer, its optical thickness must be equal to $\lambda/4$ ($\lambda$ is a wavelength between 450 and 650 nm).

In the case of a multilayer film comprising three layers, a combination may be used corresponding to the respective optical thicknesses $\lambda/4$, $\lambda/2$, $\lambda/4$ or $\lambda/4$, $\lambda/4$, $\lambda/4$.

It is also possible to use an equivalent film formed by more layers, in the place of any number of the layers which are part of the above three layers.

The preferred materials for the substrates are materials based on polymers and copolymers of the thermoplastic polycarbonate type and in particular of homopolymers and copolymers of poly(allyl carbonate).

The photochromic films obtained by drying the latexes according to the invention have a glass transition temperature $Tg \leq 30°$ C., preferably $Tg \leq 0°$ C., generally close to $-55°$ C.

EXAMPLES

The following examples illustrate the invention.

Except where otherwise stated, all percentages in the examples are expressed by weight.

The diol used was a polycaprolactone diol (PCLD) obtained from BAYER, of average number molecular weight 2 000, which was dried and degassed at 80° C. under a reduced pressure of 0.1 mm Hg for 5 hours. The diisocyanate used was an isophorone diisocyanate (IPDI) from HULS CHEMICAL. The triethylamine used during the neutralization step was a triethylamine obtained from ALDRICH and treated over a 3 Å molecular sieve for 3 days. The internal emulsifying agent was an α,α-dimethylol propionic acid (DMPA) obtained from ALDRICH, which was dried at 80° C. for 2 hours. The solvent used was N-methyl 2-pyrrolidone (NMP) from ALDRICH and the chain extension agent bis (ethylamino)amine from ALDRICH. The solvent and the chain extension agent were used without further purification.

The latexes of the examples of TABLE 1 below were prepared in the following way:

Into a dry thermostated 250 ml reactor with four inlets, equipped with a mechanical stirrer, a thermometer and a cooler, the diol (polycaprolactone diol or PCLD) and the internal emulsifying agent (DMPA) were introduced at 90° C. with stirring at an average speed of 250 rpm for 30 minutes. The reaction mixture of the diisocyanate (IPDI) was then added and allowed to react for about 3 hours at 90° C. to obtain a PU prepolymer. During the reaction, the viscosity of the reaction mixture increased and N-methylpyrrolidone was added in several steps, so as to reduce this viscosity and thus ensure good dispersion of the mixture. The reaction mixture was then cooled to 60° C. Triethylamine dissolved in N-methylpyrrolidone was then added and mixed over 1 hour so as to neutralize the carboxylic acid functions of the internal emulsifying agent DMPA. A photochromic agent in the form of a solution in N-methylpyrrolidone was then added, with stirring, to the reaction medium containing the PU prepolymer. The stirring was continued for 10 minutes. The emulsification was then performed by addition of distilled water to the mixture at 60° C. with vigorous stirring (1 000 rpm), the speed of introduction of the water being controlled with a syringe. Once the dispersion had been achieved, the chain extension agent (DETA) dissolved in N-methylpyrrolidone and water was added with a syringe and the chain extension reaction was performed for 2 hours at 60° C.

The resulting product was an anionomeric dispersion (latex) of photochromic polyurethane. The proportions of the different reagents and the nature of the photochromic agents are given in Table 1 below.

The solids concentrations of the dispersions were also determined by gravimetry by drying the dispersions at 80° C. for 12 hours.

The pH, viscosity and particle sizes of the different latexes were also determined. The viscosity of the latexes has been measured. The viscosity was close to 15 cp at 24° C., measured by a Brookfield viscosimeter.

The particle sizes of the latexes were determined by light diffusion on a MALVERN ZETASIZER 4 apparatus.

They were close to 200 nm.

The results are given in Table II below.

TABLE 1

| Ex. N° | PCLD (g) | DMPA (g) | DMPA (%) | IPDI (g) | TEA (ml) | DETA (ml) | Photochromic compound I (g) | Photochromic compound I (%) | Photochromic compound II (g) | Photochromic compound II (%) |
|---|---|---|---|---|---|---|---|---|---|---|
| 1 | 14.7384 | 0.6995 | 3.6 | 3.7577 | 0.725 | 0.220 | 0.8 | 4 | — | — |
| 2 | 14.7462 | 0.7010 | 3.6 | 3.7577 | 0.725 | 0.220 | — | — | 0.8 | 4 |
| 3 | 14.0241 | 0.9010 | 4.7 | 4.0969 | 0.935 | 0.240 | 0.79 | 4 | — | — |
| 4 | 15.1008 | 0.5812 | 3 | 3.604 | 0.7 | 0.210 | 0.6 | 3 | — | — |
| 5 | 15.1013 | 0.5820 | 3 | 3.604 | 0.7 | 0.210 | — | — | 0.6 | 3 |
| 6 | 14.739 | 0.7012 | 3.6 | 3.7524 | 0.725 | 0.220 | 0.39 | 2 | — | — |
| 7 | 14.7376 | 0.7000 | 3.6 | 3.7524 | 0.725 | 0.220 | — | — | 0.39 | 2 |
| 8 | 29.4914 | 1.3984 | 3.6 | 7.5154 | 1.455 | 0.425 | 1.6 | 4 | — | — |
| 9 | 29.4759 | 1.3982 | 3.6 | 7.5154 | 1.455 | 0.425 | — | — | 1.6 | 4 |
| 10 | 29.4682 | 1.3965 | 3.6 | 7.5154 | 1.455 | 0.425 | 3.9 | 10 | — | — |
| 11 | 29.4590 | 1.3955 | 3.6 | 7.5154 | 1.455 | 0.425 | — | — | 3.9 | 10 |

Photochromic compound I:

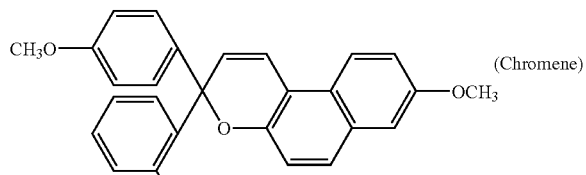

(Chromene)

Photochromic compound II:

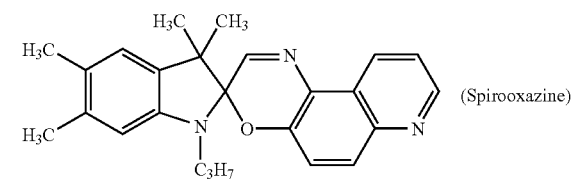

(Spirooxazine)

These photochromic compounds were introduced during the preparation on of the latex, in the form of a solution in the same solvent as that of the polymer, in concentrations of about 1 g/ml.

TABLE II

| Example N° | Particle size (nm) | Dry extract (%) | pH | Viscosity at 24° C. (mPa · s) |
|---|---|---|---|---|
| 1 | 135 | 35 | 8.2 | — |
| 2 | 160 | 32 | 8.3 | — |
| 3 | 79 | 31 | 8.1 | — |
| 4 | 275 | 31 | 8.6 | — |
| 5 | 169 | 30 | 8.4 | — |
| 6 | 126 | 32 | — | — |
| 7 | 109 | 31 | — | — |
| 8 | 132 | 32 | — | 12.5 |
| 9 | 158 | 31 | — | 17.3 |
| 10 | 170 | 32 | — | 13.7 |
| 11 | 205 | 31 | — | 19.2 |

Photochromic films based on the dispersions of table 1 were formed on Stigmal inorganic lenses and ESSILOR ORMA® organic lenses.

The conditions for producing the films were as follows:
by centrifugation (spin-coating): 600 rpm for 8 seconds, then 1 000 rpm for 7 seconds
then drying at 80° C. for 1 hour.
The films obtained had a thickness of 5 μm.

The glass transition temperatures Tg of the photochromic films obtained were measured by scanning differential calorimetry (DFC). The glass transition temperatures measured were close to −55° C.

Swelling tests were also carried out on the films with different solvents (acetone and ethanol).

The films were formed by drying on a polytetrafluordethylene plate, which was then immersed in the solvent. The swelling was studied by gravimetry).

The swelling tests in ethanol of the films obtained from the dispersions of examples 1 and 2 gave a mass swelling of the order of 1.8 for an insolubility level of 0.9 after one day.

The spectrokinetic properties of the latexes of examples 8 to 11 were also determined.

The spectrokinetic properties of these latexes were measured on photochromic varnishes under the following conditions:

temperature: 20° C. (air control).
visible lighting: 50 KLux
UV lighting: 10 W/m$^2$
10 minutes coloration by above radiation/decoloration time, after stopping UV irradiation: 20 to 30 minutes according to the spirooxazine or naphthopyran photochromic family respectively.

Figure 2:
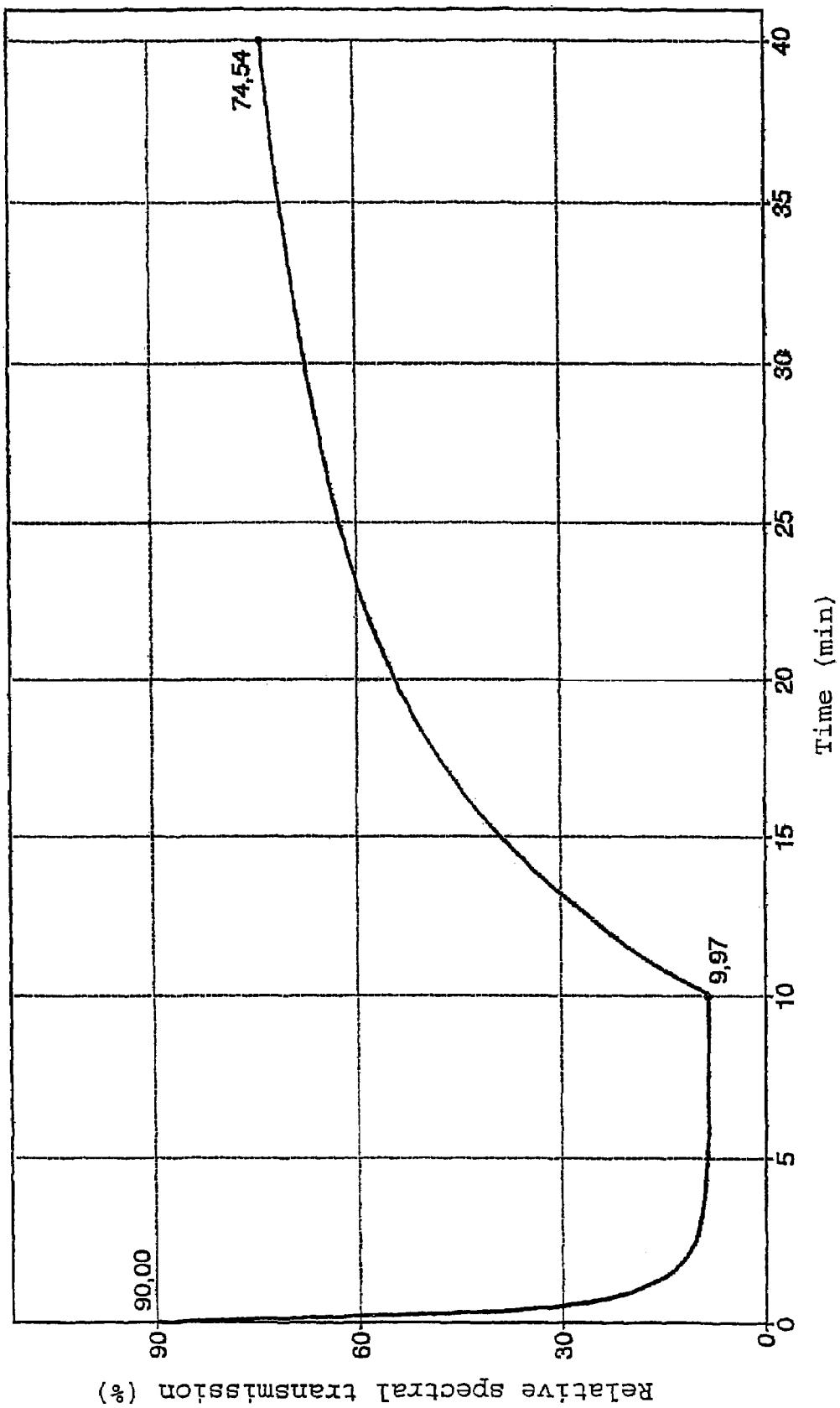
FIG. 2—Spectrokinetic properties of the latex of Example 10.
Figure 3:
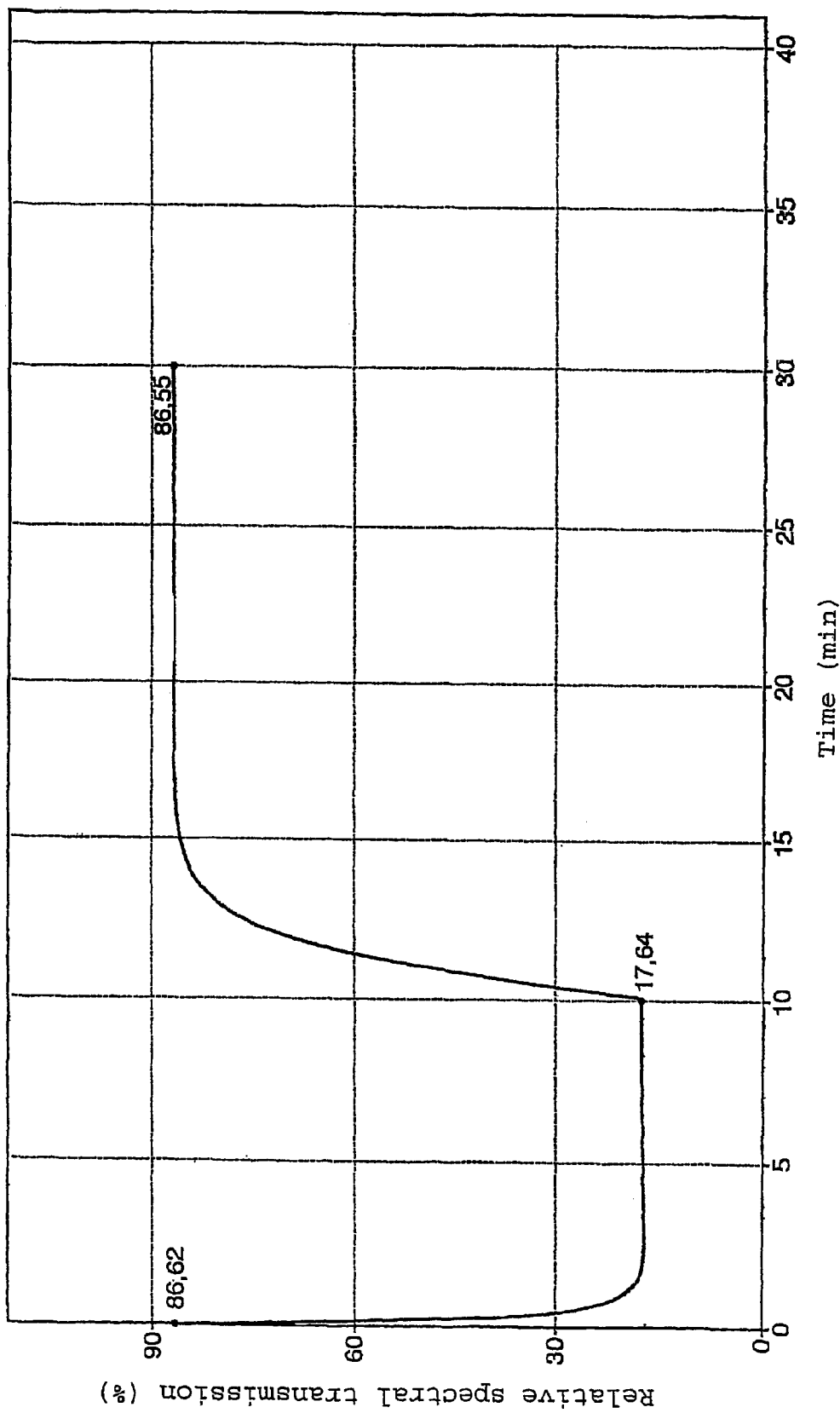
FIG. 3—Spectrokinetic properties of the latex of Example 9.
Figure 4:
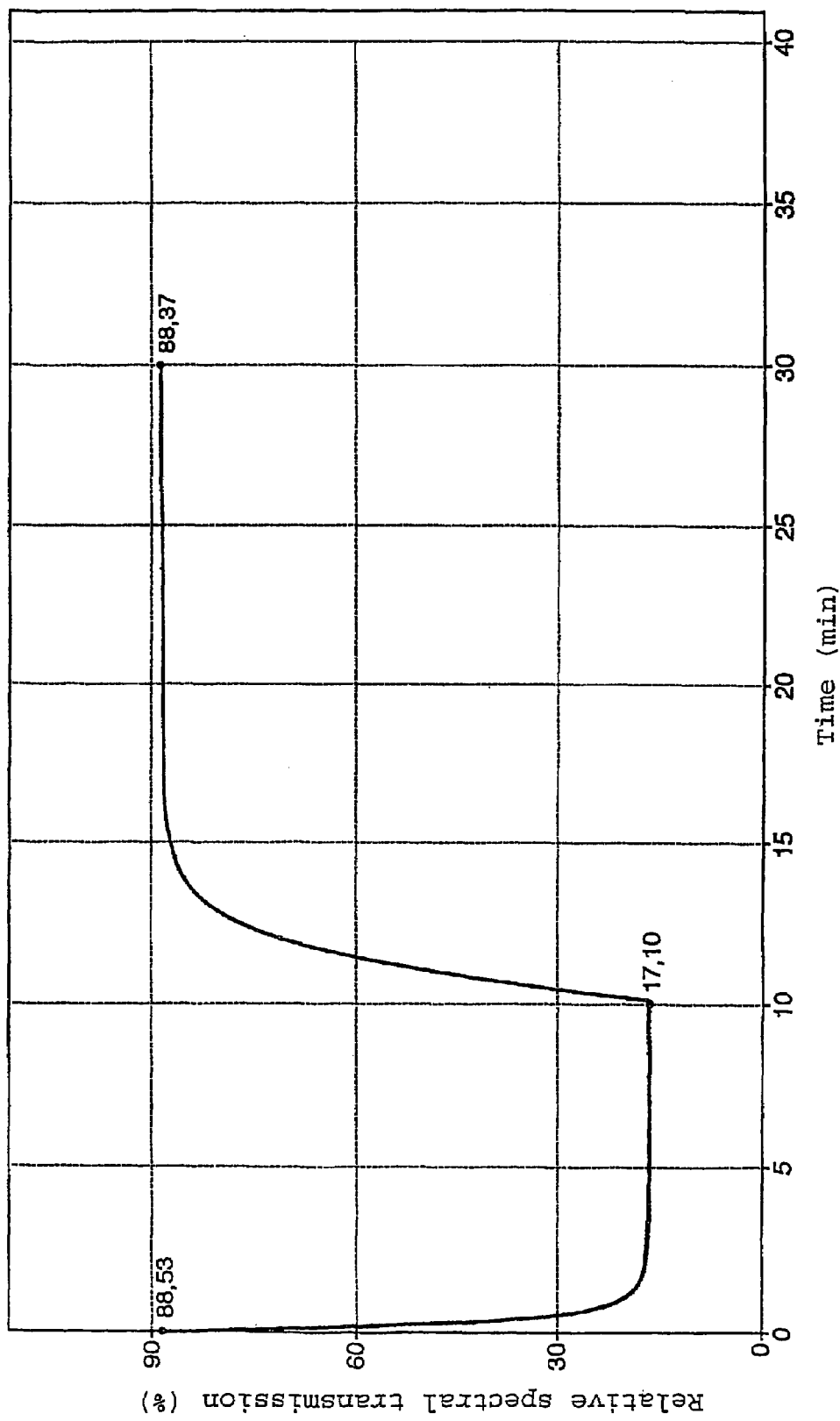
FIG. 4—Spectrokinetic properties of the latex of Example 11.

The results obtained are given in FIG. 1 (example 8), FIG. 2 (example 10), FIG. 3 (example 9), and FIG. 4 (example 11) representing the relative spectral transmission as a function of time measured at 486 nm for the examples corresponding to FIGS. 1 and 2 and at 615 nm for the examples of FIGS. 3 and 4, which correspond to the maximum absorption wavelengths respectively of the photochromic compound I (chromene) and photochromic compound II (spirooxazine).

Comparative Example

A latex was prepared from the formulation:

| | |
|---|---|
| PCLD | 29.8392 g |
| DMPA | 1.3920 g |
| IPDI | 7.515 g |
| TEA | 1.5 ml |
| H$_2$0 | 62 ml |
| DETA | 1 ml |
| NMP | 20 ml |
| Photochromic compound (II) | 1.6031 g |

The latex was prepared using a method identical to that described above except that the photochromic compound (II) was introduced into the initial mixture of PCLD, DMPA, and IPDI before the prepolymerization reaction.

The latex-based films were then deposited on the ophthalmic lenses under the same conditions as above (spin-coating, and drying at 80° C. for 1 hour).

The coated lenses diffused the light (opaque lenses).

The invention claimed is:

1. A method of preparing a photochromic polyurethane latex comprising:
    forming a hydrophilic polyurethane prepolymer with isocyanate end groups, by polyaddition of at least one polyol and at least one polyisocyanate in the presence of at least one internal emulsifying agent, wherein the quantities of the polyol and polyisocyanate are such that the molar ratio of OH groups/NCO groups is about 1/2;
    mixing the polyurethane prepolymer with a photochromic agent;
    adding water or a mixture of water and solvent, under agitation, to the mixture of the polyurethane prepolymer and the photochromic agent, to form an emulsion; and
    adding at least one chain extension agent to the emulsion and performing a chain extension reaction to give a final photochromic polyurethane latex.

2. The method of claim 1, wherein the internal emulsifying agent is an ionic emulsifying agent.

3. The method of claim 2, wherein the ionic internal emulsifying agent is an anionic internal emulsifying agent.

4. The method of claim 3, wherein the internal emulsifying agent is a diamine sulfonate, a diol sulfonate, or a dihydroxycarboxylic acid.

5. The method of claim 4, wherein the internal emulsifying agent is α,α-dimethylolpropionic acid.

6. The method of claim 2, further comprising neutralizating the polyurethane prepolymer prior to mixing it with the photochromic agent.

7. The method of claim 6, wherein neutralizing comprises the addition of a tertiary amine.

8. The method of claim 1, wherein the polyisocyanate is a diisocyanate.

9. The method of claim 8, wherein the diisocyanate is further defined as toluene-2,4-diisocyanate, toluene-2,6-diisocyanate, diphenylmethane-4,4'-diisocyanate, diphenylmethane-2,4'-diisocyanate, paraphenylene diisocyanate, biphenyldiisocyanate, 3,3'-dimethyl-4,4'-diphenylene diisocyanate, tetramethylene-1,4-diisocyanate, hexamethylene-1,6-diisocyanate, 2,2,4-trimethyl hexane-1,6-diisocyanate, lysine methyl ester diisocyanate, bis(isocyanatoethyl)fumarate, isophorone diisocyanate, ethylene diisocyanate, dodecane-1,12-diisocyanate, cyclobutane-1,3-diisocyanate, cyclohexane-1,3-diisocyanate, cyclohexane-1,4-diisocyanate, methylcyclohexyl diisocyanate, hexahydrotoluene-2,4-diisocyanate, hexahydrotoluene-2,6-diisocyanate, hexahydrophenylene-1,3-diisocyanate, hexahydrophenylene-1,4-diisocyanate, perhydrodiphenylmethane-2,4'-diisocyanate, perhydrophenylmethane-4,4'-diisocyanate, or a mixture of two or more such diisocyantates.

10. The method of claim 9, wherein the diisocyanate is isophorone diisocyanate.

11. The method of claim 1, wherein the polyol is further defined as a polyol of low molecular weight, a polyester polyol, a polyether polyol, a polyol containing an amide group, a polyacrylic polyol, an epoxy polyol, a polyvinyl polyol, a urethane polyol, or a mixture of two or more such polyols.

12. The method of claim 11, wherein the polyol is a polycaprolactone diol.

13. The method of claim 1, comprising adding a quantity of the photochromic agent representing from 0.1 to 15% by weight with respect to the total weight of polyol, polyisocyanate, internal emulsifying agent, and photochromic agent.

14. The method of claim 13, further defined as comprising adding a quantity of the photochromic agent representing from 2 to 10% by weight with respect to the total weight of polyol, polyisocyanate, internal emulsifying agent, and photochromic agent.

15. The method of claim 1, wherein the photochromic agent is added in the form of a solution in a solvent.

16. The method of claim 15, wherein the solvent is N-methylpyrrolidone.

17. The method of claim 1, further defined as comprising the addition of a solvent during the process of forming the hydrophilic polyurethane prepolymer.

18. The method of claim 17, wherein the solvent is N-methylpyrrolidone.

19. The method of claim 1, wherein the chain extension agent is an aliphatic diamine, a cycloaliphatic diamine, a triamine, a tetramine, or a mixture of two or more such extension agents.

20. The method of claim 19, wherein the chain extension agent is ethylenediamine, diethylenetriamine, or tris(2-aminoethyl)amine.

21. The method of claim 1, wherein the final polyurethane latex has a concentration of solids of at least 30% by weight.

22. The method of claim 21, wherein the final polyurethane latex has a concentration of solids of 30 to 35% by weight.

23. The method of claim 1, wherein the final polyurethane latex has a particle size of from 50 to 300 nm.

24. The method of claim 23, wherein the final polyurethane latex has a particle size of from 150 to 250 nm.

25. The method of claim 1, comprising using a quantity of internal emulsifying agent of from 3 to 5% by weight with respect to the total weight of polyol, polyisocyanate, and internal emulsifying agent.

26. The method of claim 1, wherein the photochromic agent is chromene, a chromene compound, an oxazine compound, a fulgide, a fulgimide, or a metallic salt of dithizonate.

27. The method of claim 1, further defined as comprising using a molar ratio prepolymer/chain extension agent of between 0.2 and 2.

28. A method of preparing a photochromic polyurethane latex comprising:
    forming a hydrophilic polyurethane prepolymer with isocyanate end groups, by polyaddition of at least one polyol and at least one polyisocyanate in the presence of at least one internal emulsifying agent, wherein the amount of the internal emulsifying agent is from 3 to 5% by weight with respect to the total weight of polyol, polyisocyanate, and internal emulsifying agent;
    mixing the polyurethane prepolymer with a photochromic agent;
    adding water or a mixture of water and solvent, under agitation, to the mixture of the polyurethane prepolymer and the photochromic agent, to form an emulsion; and
    adding at least one chain extension agent to the emulsion and performing a chain extension reaction to give a final photochromic polyurethane latex.

* * * * *

UNITED STATES PATENT AND TRADEMARK OFFICE
CERTIFICATE OF CORRECTION

PATENT NO. : 7,608,207 B2  Page 1 of 1
APPLICATION NO. : 10/332287
DATED : October 27, 2009
INVENTOR(S) : Vassal et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 269 days.

Signed and Sealed this

Twelfth Day of October, 2010

David J. Kappos
*Director of the United States Patent and Trademark Office*